Oct. 25, 1949.  E. L. GINZTON  2,485,583
RADIO DISTANCE MEASURING SYSTEM
Filed Oct. 29, 1943
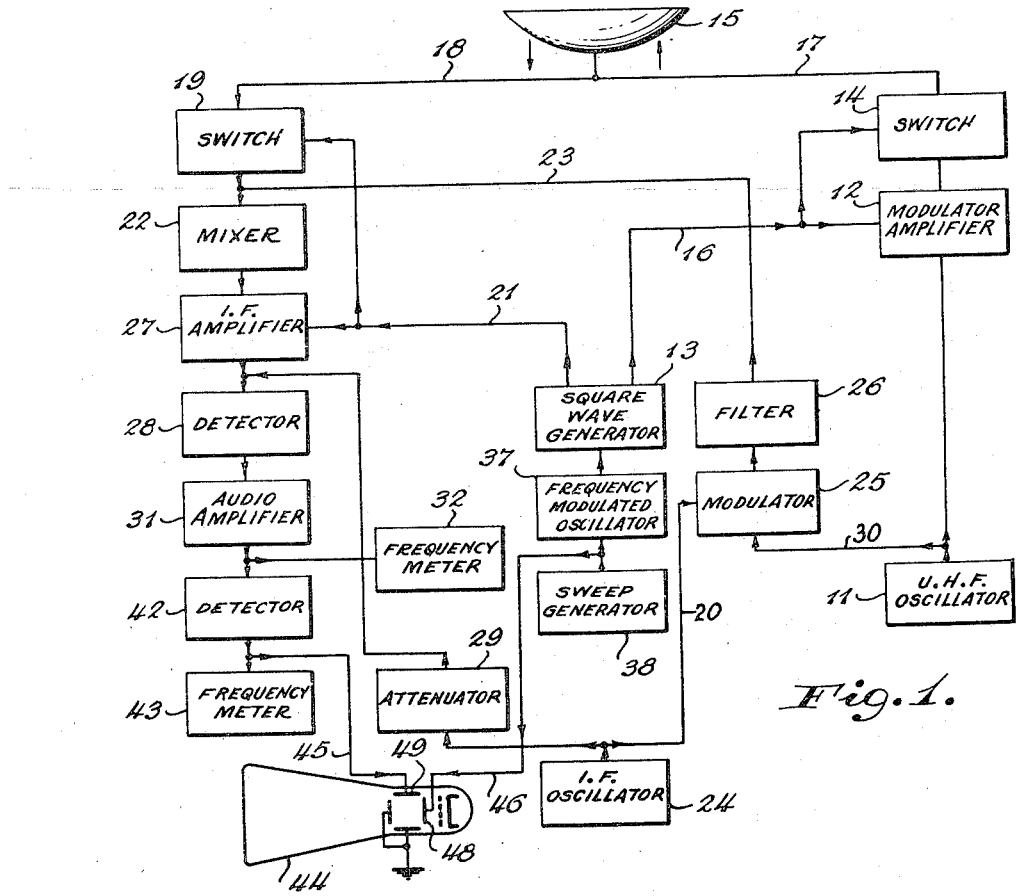
Fig. 1.
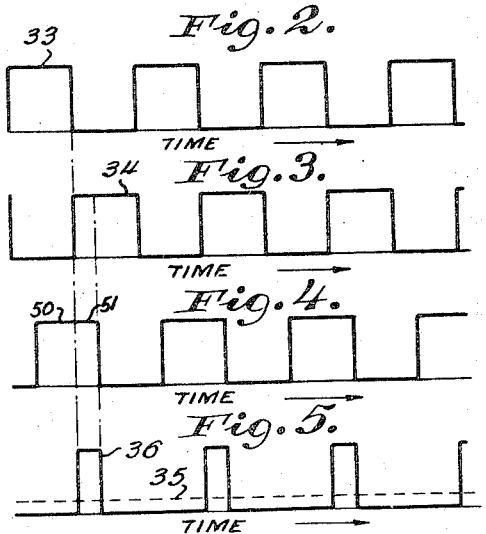
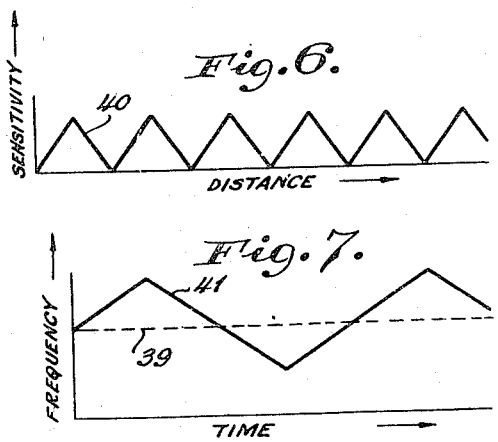
INVENTOR
EDWARD L. GINZTON
BY
ATTORNEY Patented Oct. 25, 1949

2,485,583

UNITED STATES PATENT OFFICE 2,485,583

RADIO DISTANCE MEASURING SYSTEM

Edward L. Ginzton, Garden City, N. Y., assignor to The Sperry Corporation, a corporation of Delaware Application October 29, 1943, Serial No. 508,196

8 Claims. (Cl. 343—13)

The present invention relates generally to radio object detection and location and, more particularly, to novel means and methods for measuring distance to objects with radio systems employing the Doppler phenomenon for detection.

It is well known that when a reflecting object has a component of velocity relative to a radio transmitter, that portion of the intercepted radiant energy that is returned toward the source of radiation differs in frequency from the transmitted energy because of the Doppler effect. This frequency difference is directly proportional to both the radial velocity of the object and the frequency of the transmitted wave. The radiated and reflected waves may be mixed in a detector to produce a beat frequency or Doppler beat note revealing the presence of the moving object, and this frequency may then be measured to provide an accurate knowledge of the radial velocity of the object.

Means for measuring the distance of a moving object have been disclosed in application No. 459,039, now Patent No. 2,415,095, issued February 4, 1947, a division of application No. 185,382, entitled Radio measurement of distances and velocities, and originally filed January 17, 1938, in the names of Russell H. Varian and William W. Hansen, now Patent No. 2,415,094, issued February 4, 1947. The method employed in the prior system comprises the steps of radiating a radio frequency wave in pulses, receiving the wave during intervals between pulses after it has been reflected from the moving object, next, detecting a beat note wave corresponding to the frequency difference between the radiated and received waves, then adjusting the pulse repetition rate to maximize the amplitude of the beat note wave, and finally measuring the distance in terms of the resultant pulse rate. This method of measuring distance requires a delicate manual adjustment, great care being necessary to avoid taking distance measurement on an incorrect maximum, and has the further limitation that only a single object may be observed at a time.

It is, therefore, the principal object of the present invention to provide improved means and methods for measuring distance to remote objects having motion relative to the measuring point.

Another object lies in the provision of a radio object locator system that is insensitive to undesired reflections from stationary objects and that measures distances to objects having motion relative to said system in terms of characteristic frequencies introduced by the space relationships between the objects and the system.

Yet another object of the invention is to provide a radio object locator that is adapted to divide the field of view into a plurality of depth zones defined by recurrent points of zero receiver sensitivity and having intermediate points of maximum receiver sensitivity and in effect to sweep these zones past objects in space, thereby causing a variation in amplitude of the beat notes created by presence of these objects at frequencies proportional to their respective distances.

Other objects and advantages will become apparent from the specification taken in connection with the accompanying drawing wherein one embodiment of the invention is illustrated.

Figure 1 is a block diagram of an embodiment of the present invention, wherein arrows indicate the direction of control or energy flow.

Figures 2 through 5 are graphs of voltage waves illustrative of the operation of the structure shown in Figure 1, and having amplitudes and times drawn to an arbitrary scale along vertical and horizontal axes, respectively.

Figure 6 is a graph of the relative sensitivity of the receiver incorporated in the present system as a function of distance, neglecting for the sake of simplicity the normal attenuation of radiant signals with distance.

Figure 7 is a graph of the wave employed to frequency modulate the keying waves illustrated in Figures 2 and 3.

In the essential embodiment of the present invention an ultra high frequency transmitter is caused to radiate waves toward a moving object. A receiver adjacent to the transmitter is responsive to the waves after reflection from the object and includes a detector for comparing frequencies related to the radiated and reflected waves to obtain a beat note wave occasioned by the relative motion of the object.

Control or keying means are provided to alternately inhibit the operation of the transmitter and the receiver periodically. The control means preferably provides a substantially rectangular wave which is adapted to key the transmitter so that it radiates half the time and is quiescent half the time. The gain of the receiver is controlled synchronously in an out-of-phase relationship so that the receiver is responsive only when the transmitter is off and vice versa.

The length of time that a radiant wave is reflected by an object back to the receiver is substantially equal to the length of time that the receiver operates. The actual instant that the reflected energy arrives at the receiver depends upon the distance of the object from the locator system. In fact, it may occur that the transit time to and from the object is such that the reflected wave is returned exactly during the time when the receiver is off and thus produces no indication in the receiver output. On the other hand, the time delay may be such that the arriving wave coincides with the responsive period of the receiver and the Doppler beat note is produced as if the gain of the receiver were not keyed at all.

It is therefore observed that the sensitivity of the system varies in a periodic manner with distance, being zero for certain points in space and increasing to a maximum at intermediate points. The keying frequency is made sufficiently high so that the distance between the locator and the maximum desired range is covered by a large number of sensitivity zones.

Assume that there are ten sensitivity zones in ten miles from the system. Then let the keying frequency of the control means be periodically altered, say by one tenth of its original value, at a frequency of, for example, 10 cycles a second. This would mean that the number of sensitivity zones in the first ten miles would be changed from ten to eleven and back ten times each second, and therefore the Doppler beat note from an object at this distance would be modulated at a fundamental frequency of 20 cycles a second. If the object were located at a distance of twenty miles, then at one instant there would be twenty sensitivity zones between it and the system and at another moment there would be twenty-two so that two sensitivity zones would be swept back and forth across the object. The Doppler beat note from this object would then be modulated at 40 cycles a second. It can be seen that the frequency at which the Doppler beat note is modulated, due to the frequency modulation of the keying wave, is a harmonic of the frequency modulation signal and proportional to the distance. The Doppler beat note may therefore be rectified and the resultant modulation signal can be measured by a frequency meter to obtain an indication of this distance.

A particular embodiment of the invention is illustrated in Fig. 1. An ultra high frequency oscillator 11, which may be a conventional electron beam velocity modulation device, produces a radio wave of substantially constant frequency and amplitude which is impressed upon a modulator amplifier 12. A square wave generator 13 applies a rectangular keying wave over a lead 16 to the modulator 12 for the purpose of varying the amplitude of the wave supplied from oscillator 11. The keying wave also controls an electronic switch 14. The keying wave is illustrated in Fig. 2 showing that the transmitter is keyed on and off for substantially equal time intervals. The power output of amplifier modulator 12 is transmitted through the switch 14 over a shielded line 17 and radiated from a directive radiator 15 which is represented as a parabola but which may of course be an electromagnetic horn or other directive structure. Although it is incidental to the invention, radiator 15 may be adapted to scan an area with its directive beam by appropriate mechanical actuation of a type well known in the radio locating art.

The ultra high frequency wave is radiated into space and a portion of its energy is reflected from a moving object, if present, while other portions are scattered by the ground or returned toward the transmitter from stationary objects. This reflected and scattered energy is also received by the radiator 15 and conducted over a line 18 similar to the line 17, to a switch 19 similar to the device 14. The switch 19 is actuated by keying pulses supplied over a line 21 from the square wave generator 13 in phase opposition to the pulses supplied over lead 16.

The operation of switch 19 corresponds to the wave shown in Figure 3 where it is seen to permit energy to pass to the receiver only during periods when the transmitter is quiescent. The complementary actions of switches 14 and 19 assure that the energy from modulator amplifier 12 is radiated without damaging the associated receiving circuits with its high power and also avoid loss of the transmitter energy therein. The extremely weak received energy is likewise prevented from being dissipated in the transmitter circuits.

In practice, it is usual to leave a slight blank interval between the transmitter and receiver operating periods to allow the switches 14 and 19 to deionize if of the gaseous resonator type and to reduce the strong reflections from nearby stationary objects.

The reflected energy received during the periods when the transmitter is off is therefore transmitted by switch 19 to a mixer 22 wherein the energy is heterodyned with a local oscillator frequency supplied over a lead 23 and derived in the following manner.

An oscillator 24 is adjusted to provide a wave of suitable intermediate frequency or a submultiple thereof. The intermediate frequency wave is fed over a lead 20 to the signal input of a modulator 25 which is provided with a carrier frequency supplied by a lead 30 from the ultra high frequency oscillator 11. The output of modulator 25 contains frequencies equal to the carrier and a plurality of side bands. A filter 26 selects one of the side bands that is spaced at the intermediate frequency from the carrier frequency and rejects the other waves. The output of the filter 26 is connected to the lead 23, and thus the mixer 22 is supplied a wave of substantially constant amplitude and so derived that it always differs from the transmitted frequency by exactly the desired intermediate frequency. The mixing of the output voltage of the switch 19 and the wave supplied over the lead 23 results in a plurality of frequencies grouped around the intermediate frequency.

The output of mixer 22 is connected to an intermediate frequency amplifier 27 whose operation is controlled by the same keying wave as is supplied to switch 19. This wave may be introduced on the screen grids or other control electrodes associated with the amplifier 27 and alters the gain of device 27 abruptly between zero and some normal value at the repetition rate of the transmitted pulses. The band width of amplifier 27 is preferably sufficiently narrow so that side bands corresponding to the keying frequency and its harmonics are not amplified.

The output of amplifier 27 is combined in a detector 28 with a wave of intermediate frequency taken from oscillator 24 and suitably reduced in amplitude by an attenuator 29. Detector 28 combines the locally produced intermediate frequency with the intermediate frequency created from the reflected energy. A radial component of motion on the part of a reflecting object shifts the latter frequency, and Doppler frequency waves result from the heterodyning of the two slightly different intermediate frequency waves. The reflected energy from stationary objects does not differ in frequency from the locally generated wave and, therefore, produces upon mixing only a direct voltage component.

The Doppler beat note is amplified by an audio amplifier 31 and a frequency meter 32 attached thereto measures the predominate audio frequency and thereby provides an indication of the radial velocity of a single object. If the frequency meter 32 is of the vibrating reed type, it will indicate the velocities of a plurality of moving objects.

The system thus far described provides a convenient means for detecting objects and measuring the radial velocities. The time separation of the operations of the transmitter and receiver eliminates spurious modulation of the receiver caused by direct leakage of transmitter energy thereto. This leakage may effect statistical noise modulation which increases the receiver noise level. This time separation also enables a single radiator to take the place of duplicate structures. It provides, moreover, a convenient basis for the measurement of the range of the detected objects which is the essence of the present invention.

In the operation of Figure 1, the transmitter energy is radiated during the periods indicated by pulse 33 in Figure 2, while the receiver is responsive during alternate periods indicated by reference numeral 34 in Figure 3. The transit time of radiant energy travelling to and from a remote object introduces a time delay in the wave impinging upon radiator 15 with respect to that originally transmitted; consequently the envelope of the energy returning from a particular object appears in idealized form like the wave 50 shown in Figure 4. Only the portion 51 of the reflected energy that overlaps in time the period of responsiveness of the receiver can affect the output circuits of the same.

Thus in the case of an object providing a reflected wave of the general character of the pulse 50 in Figure 4, switch 19 passes only the narrow pulses indicated by reference numeral 36 in Figure 5. The pulses 36 constitute the modulation envelope of the reflected ultra high frequency wave and may be analyzed as a carrier having an amplitude proportional to the pulse width and side bands separated from the carrier by the fundamental and harmonics of the keying frequency. As has been said, the intermediate frequency amplifier 27 has a band width so restricted that only the carrier frequency wave is transmitted. The amplitude of the Doppler beat note is proportional to this carrier wave whose magnitude is represented by dashed line 35 in Figure 5. Dependent upon the time delay of the reflected energy, the carrier amplitude and therefore the amplitude of the Doppler beat note produced by detector 28 varies in amplitude from zero to a maximum equal one-half the reflected pulse amplitude.

The sensitivity of the receiving apparatus to the Doppler beat note alters with the distance of the reflecting object in a manner illustrated in Figure 6, where curve 40 represents the variation under consideration, and the familiar inverse fourth power attenuation of signals in radio locator systems with range has been factored out for the sake of clarity. The sensitivity is seen to be zero at zero range and at ranges for which all the return signal arrives when the switch 19 is closed and the amplifier 27 blocked, while the sensitivity is a maximum when the reverse conditions are true. The distance between adjacent points of corresponding sensitivity may easily be shown to be equal to the velocity of propagation divided by twice the keying frequency. The keying frequency is chosen sufficiently high to create a large number of these sensitivity zones within the distance limits of the object locating system. This phenomenon of receiver sensitivity appearing as a recurrent function of distance, is utilized in a novel manner by means presently to be disclosed.

An oscillator 37 provides a wave of keying frequency to the square wave generator 13, where it is shaped to suit the requirements of its switching functions, and employed as previously described. A sweep generator 38 is adapted to frequency modulate the oscillator 37 at a low audio frequency. The frequency modulation is preferably linear, rather than sinusoidal, and, therefore, the sweep generator 38 produces a pyramidal or saw tooth wave which gives rise to a keying frequency variation, such as shown by the curve 41 in Figure 7. A dashed line 39 represents the mean or average keying frequency.

The result of this frequency modulation is to alter the sensitivity-distance characteristic of Figure 6, by extending and contracting the plot in an accordion-like fashion. The sensitivity zones are, in effect, swept back and forth, crossing and recrossing any objects in the path of the radiation. It is evident that the more distant an object is from the locator system, the more zones are swept past it during each frequency modulation cycle. The Doppler beat note resulting from a moving object is thus modulated at some harmonic of the frequency of frequency modulation, which harmonic characterizes the distance of the object.

A detector 42 is connected to the output of audio amplifier 31 for the purpose of demodulating this distance denoting frequency. The lower cut-off frequency of amplifier 31 is arranged to be higher than the frequency of sweep generator 38 and its important harmonics. Thus only the modulated Doppler frequencies are amplified. This filtering action means that the beat notes produced by very slow moving objects are eliminated from the output of amplifier 31. However, in practical applications of the present locator system, significant objects are aircraft and only those having appreciable radial components of velocity, that is, only those approaching or receding are of interest.

The distance frequency produced by detector 42 may be measured by a frequency meter 43, which may conveniently be of a vibrating reed type. The modulation of the Doppler beat note is not sinusoidal but has harmonic components which fall off as the inverse square of the number of the harmonic. Thus an object produces an indication which has a predominate, an unmistakable frequency but may be accompanied by some weak harmonics of perceptible amplitude.

An alternate arrangement for indicating range is provided by a cathode ray oscilloscope 44, having horizontal and vertical deflection electrodes 48 and 49, respectively. The frequency modulation frequency from generator 38 is introduced over a lead 46 to the horizontal plates 48 and the rectified Doppler frequency is fed to the vertical electrodes 49 through lead 45. The resultant pattern is a series of pyramidal or saw-tooth waves which remain stationary because of the harmonic relationship between the two deflecting voltages. The number of wave peaks of substantially equal amplitude is proportional to the number of whole sensitivity zones or integral distance units contained in the distance from the apparatus to the moving object. The fractional sensitivity zone or partial distance unit in excess of this integral number is indicated on the face of oscilloscope 44 by a minor wave peak whose amplitude relative to the major peaks is a measure of the fraction. Thus, the measurement of an object progressing through a sensitivity zone as the object is going, for example, away from the radio apparatus is indicated as a series of peaked waves with a minor wave peak beginning to appear. This minor wave increases in amplitude until it assumes the same size as the other wave peaks, whereupon a new minor wave commences.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method of determining the distance between an object having motion relative to a viewpoint and said viewpoint, the steps comprising alternately and periodically radiating radio frequency energy for a given time period and receiving for an equal time period, varying the duration of said time period, mixing the frequencies of said transmitted and received energies to obtain a beat note due to said relative motion, changing the periodicity with which said energies are radiated and received as a function of time to cause the strength of said beat note to vary at a frequency in accordance with the distance of said object from said viewpoint, and automatically indicating said distance by measuring said distance responsive frequency.

2. In a radio system for determining the distance of an object having motion relative to said system, the combination comprising transmitting means for radiating radio frequency waves toward said object, receiving means responsive to said waves after reflection from said object, detecting means for heating together frequencies related to said radiated and reflected waves to obtain a beat note wave occasioned by said relative motion, control means for alternately inhibiting the operation of said transmitting receiving means periodically for equal periods, and means for frequency modulating the periodicity of said control means to amplitude modulate said beat note wave at a frequency dependent upon said distance, and automatic frequency meter indicating means responsive to said amplitude modulation to indicate said distance measurement.

3. A method of determining the distance to an object having motion relative to the point of measurement comprising the steps of radiating a radio frequency wave in pulses, receiving said wave during intervals between pulses after said wave has been reflected from said object said pulses and said intervals being equal, detecting a beat note wave corresponding to the frequency difference between said radiated and received waves caused by said relative motion, rectifying said beat note wave, frequency modulating said pulse rate to vary the amplitude of said rectified beat note wave, and automatically measuring the frequency of said variation of rectified beat note wave to determine said distance.

4. A distance determining radio system comprising means for transmitting a radio frequency wave in pulses at a suitable repetition rate, means for receiving said wave during intervals between pulses after said wave has been reflected from an object having motion relative to said system said pulses and said intervals being equal, means for detecting a beat note corresponding to the frequency difference between said transmitted and received waves, means for periodically varying said repetition rate to vary the strength of said beat note, and automatic frequency meter means for measuring the frequency at which the strength of said beat note varies to determine said distance.

5. In a radio system for determining the distance to an object having motion relative to said system, the combination comprising means for alternately and periodically radiating for a time period and receiving for an equal time period, means for varying the duration of said time period, means for detecting a Doppler beat note corresponding to the frequency difference between said radiated and received waves, means for varying the frequency of alternation of said second means as a function of time to amplitude modulate said Doppler beat note at a frequency substantially proportional to said distance, and automatic frequency meter indicating means responsive to said amplitude modulation to indicate said distance measurement.

6. A radio system for determining the distance to an object having motion relative to said system, comprising means for generating radio frequency waves, means for alternately and periodically radiating for a time period and receiving over an equal time period, means for varying the duration of said time period, means for detecting a Doppler beat note corresponding to the frequency difference between said radiated and received waves, means for varying the frequency of alternation of said second means as a function of time to amplitude modulate said Doppler beat note at a frequency substantially proportional to said distance and frequency meter means for automatically measuring the frequency of said modulation to determine said distance.

7. A radio system for determining the distance of an object moving relative to said system comprising transmitting means for radiating radio frequency energy into space, receiving means responsive to energy reflected from said object and to energy from said transmitting means for obtaining a beat note in accordance with the movement of said object, switching means for alternately and periodically operating said transmitting and receiving means for equal time intervals, means for varying the periodicity of said switching means as a function of time, and frequency meter means for automatically measuring the frequency of amplitude variations of said beat note due to said varying periodicity of said switching means to determine said distance.

8. In a radio system for determining the distance to an object having motion relative to said system, the combination comprising means for generating radio frequency energy, means for alternately and periodically radiating for a time period and receiving for an equal time period, means for varying the duration of said time period, means for mixing the frequencies of said generated and received energies to obtain a difference frequency wave depending upon said relative motion and a frequency meter responsive to an amplitude modulation due to said variation of said time period to indicate said distance measurement.

EDWARD L. GINZTON.

REFERENCES CITED

The following references are of record in the file of this patent:

UNITED STATES PATENTS

| Number | Name | Date |
|---|---|---|
| 2,193,361 | Rice | Mar. 12, 1940 |
| 2,406,316 | Blumlein | Aug. 27, 1946 |
| 2,407,000 | Evans | Sept. 3, 1946 |
| 2,415,095 | Varian | Feb. 4, 1947 |
| 2,426,216 | Hight | Aug. 26, 1947 |
| 2,426,216 | Hight | Aug. 26, 1947 |
| 2,433,341 | Busignies | Dec. 30, 1947 |

Certificate of Correction

Patent No. 2,485,583

October 25, 1949

EDWARD L. GINZTON

It is hereby certified that error appears in the printed specification of the above numbered patent requiring correction as follows:

Column 7, line 54, for the word "heating" read *beating*;

and that the said Letters Patent should be read with this correction therein that the same may conform to the record of the case in the Patent Office.

Signed and sealed this 2nd day of May, A. D. 1950.

[SEAL]

THOMAS F. MURPHY,
*Assistant Commissioner of Patents.*